(12) United States Patent
Das et al.

(10) Patent No.: US 12,717,846 B1
(45) Date of Patent: Aug. 25, 2026

(54) DIMENSION REDUCTION FOR PERFORMING MULTIMODAL EMBEDDING SEARCHES

(71) Applicant: Amazon Technologies, Inc., Seattle, WA (US)

(72) Inventors: Rajshekhar Das, Los Angeles, CA (US); Hao Yang, Seattle, WA (US); Gukyeong Kwon, Jersey City, NJ (US); Varad Gunjal, Brooklyn, NY (US); Zhizhong Li, Seattle, WA (US); Abhinav Goyal, Snohomish, WA (US); Ashwin Swaminathan, Dublin, CA (US); Orchid Majumder, Kirkland, WA (US); Rohit Mittal, Short Hills, NJ (US); Jin Hua Huang, Merrick, NY (US); Rahul Tewari, Seattle, WA (US); Brahmananda Reddy Boggula, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/621,954

(22) Filed: Mar. 29, 2024

(51) Int. Cl.
*G06F 16/903* (2019.01)

(52) U.S. Cl.
CPC .............................. *G06F 16/90335* (2019.01)

(58) Field of Classification Search
CPC ................................................ G06F 16/90335
See application file for complete search history.

(56) References Cited

U.S. PATENT DOCUMENTS 10,565,305 B2 2/2020 Lu et al.
12,210,516 B1 * 1/2025 Zhu .................... G06F 16/2425
2012/0179634 A1 * 7/2012 Chen ...................... G06F 16/35 706/12
2020/0104318 A1 4/2020 Ponjou Tasse et al.
2020/0349464 A1 11/2020 Lin et al.
2023/0222285 A1 7/2023 Zhang et al.
2024/0040201 A1 * 2/2024 Lee ....................... G06F 3/0482
2024/0330446 A1 * 10/2024 Bulut ..................... G06N 3/045
2024/0354333 A1 * 10/2024 Dolev ..................... G06F 16/53
2024/0403362 A1 * 12/2024 Kharbanda ............ G06F 16/71
2024/0419726 A1 * 12/2024 Jenni ..................... G06F 16/535
2025/0022030 A1 * 1/2025 Partalas ............ G06Q 30/0627
2025/0200945 A1 * 6/2025 Daftary ............ G06F 16/24578

* cited by examiner

*Primary Examiner* — Courtney Harmon
(74) *Attorney, Agent, or Firm* — S. Scott Foster; Kowert, Hood, Munyon, Rankin & Goetzel, P.C.

(57) ABSTRACT

Dimension reduction is performed for multimodal embedding searches. A request to perform a search using input data of a modality of a multimodal machine learning model is received. The input data is encoded using the multimodal machine learning model to generate a first embedding that represents the input data. A machine learning dimension reduction technique is applied to the first embedding to generate a second embedding with a reduced number of dimensions. This second embedding is then used to search an index of data objects also generated using both the multimodal machine learning model and the machine learning dimension reduction technique.

20 Claims, 8 Drawing Sheets

DIMENSION REDUCTION FOR PERFORMING MULTIMODAL EMBEDDING SEARCHES

BACKGROUND

Neural network models, such as transformer-based models, have become increasingly more capable in solving complex problems in various domains in recent years. Some large models may have billions of parameters. Training and executing the models, as well as applications built using the models, can require substantial computing resources.

Figure 1:
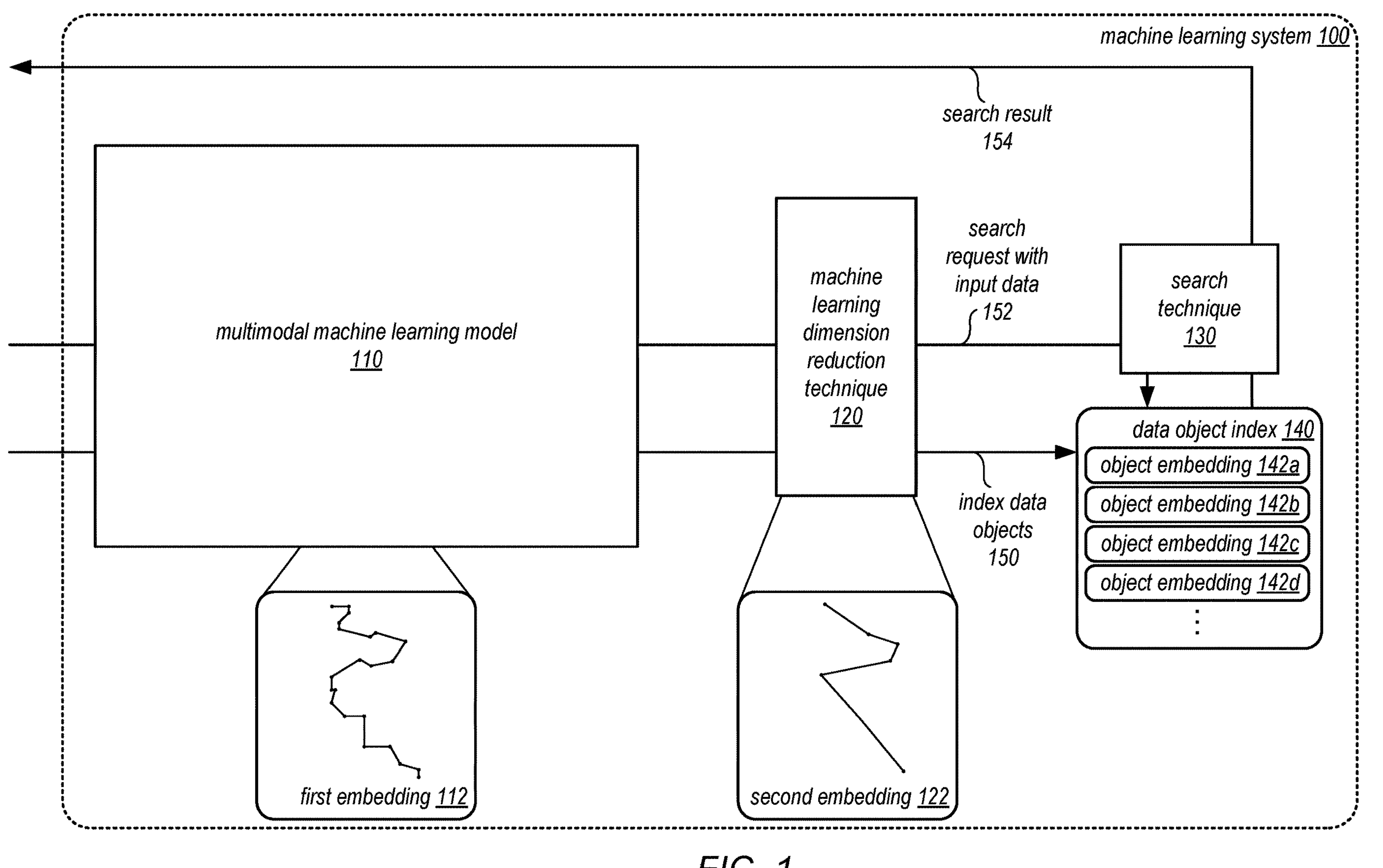
FIG. 1 illustrates a logical diagram of dimension reduction for performing multimodal embedding searches, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word “may” is used in a permissive sense (i.e., meaning having the potential to), rather than the mandatory sense (i.e., meaning must). Similarly, the words “include,” “including,” and “includes” mean including, but not limited to.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Multimodal machine learning models accept or operate on more than one modality of data (e.g., different types of data, such as text data, image data, audio data, video data, etc.). Because of multimodal machine learning models wide range of data types, multimodal machine learning models offer powerful machine learning capabilities to systems, services, or applications that operate on more than data modality. One example use case of multimodal machine learning models is for search systems, services, or application. A given input of data in one modality (e.g., text), or more modalities, can be used to find data in another modality (e.g., an image). For example, a text search for a “blue shirt” can be used to retrieve images of a “blue shirt.”

A challenge of multimodal machine learning models for search use cases is search latency. Multimodal encoders can have a fixed high-dimensional embedding (e.g., vector of hundreds/thousands of dimensions) that usually result in high latencies for downstream tasks like search. Thus, it may be difficult to integrate multimodal machine learning models in time-sensitive search applications. Accordingly, it may be highly desirable to implement techniques for using multimodal machine learning models that minimizing latency without sacrificing performance (e.g., accuracy/quality) of the search results.

Sources of latency in multimodal machine learning model search applications are the encoding of input data and retrieval latency. Encoding latency may refer to the time taken to map a query data (e.g., image or text), sometimes referred to herein as input data, to its representation (e.g., embedding that is vector of dimensions). Retrieval latency may refer to the time taken to perform a search technique using the embedding of the query data when compared with embeddings of data objects that can be returned in the result. Under large scale settings with hundreds of millions, or even billions of data objects in the retrieval set, the retrieval latency often dominates the overall latency. In order to reduce overall latency, various techniques for dimension reduction for performing multimodal embedding searches are described herein that can reduce the retrieval latency of embeddings produced by multimodal machine learning models without sacrificing too much performance.

A computation that influences the retrieval latency may be the construction of similarity matrix between an embedding of query data and embeddings of data objects that directly depends on the embedding dimensions. Reducing the number of dimensions of embeddings may correspondingly reduce retrieval latency. To overcome these challenges, different techniques for reducing dimensions are implemented in various embodiments and discussed in detail below. For example, each embedding may be generated by a combination of a shared backbone model, the multimodal machine learning model, and a lightweight projection technique that is cascaded to the backbone model. The projection technique to reduce dimensions can be implemented in various ways, using linear or non-linear techniques. For linear projection, principal component analysis (PCA) is one example of a technique used to derive a projection matrix from a training dataset. For non-linear projection, one example of a technique may be to train multilayer perceptrons (MLP) with two layers (or more) using larger training datasets. Such a lightweight cascaded technique allows for a range of latency scenarios, ranging from high performance to low latency tasks, with almost negligible storage overheads. Further optimizations may be gained by including different combinations of search techniques that operate on the reduced dimension embeddings produced by the cascading technique.

It may be apparent to one of ordinary skill in the art that the various techniques for dimension reduction for performing multimodal embedding searches can increase the availability of multimodal machine learning models for systems, services, or applications that have lower latency constraints. In this way, these systems, services, or applications can take advantage of the powerful analysis capabilities that multimodal machine learning models offer. Thus, techniques for dimension reduction for performing multimodal embedding searches may improve the performance of these systems, services, or applications that implement multimodal machine learning model search, as well as reduce usage of computing resources and improve the performance of computer-related technologies more generally.

Besides optimizing for embedding dimensions, other directions that can yield good performance-latency tradeoffs include better search algorithms and efficient representations. While the main goal of this doc is not to optimize for these aspects, we analyze specific approaches to show their complementary benefits to dimensionality reduction. For better search algorithm, we provide a comparison between exact and approximate methods and for efficient representations, we plan to explore ideas based on vector quantization.

FIG. 1 illustrates a logical diagram of dimension reduction for performing multimodal embedding searches, according to some embodiments. Machine learning system 100 may be a standalone system, single service, or one or many different services offered by a provider network, like provider network 201, discussed in detail below. Machine learning system 100 may implement or make use of machine learning models and/or other machine learning techniques to perform various tasks, such as performing search on a set of data objects (e.g., images, text, or other data modalities), given a search request with input data 152 (e.g., query data of one or more of the data modalities used to train multimodal machine learning model).

Multimodal machine learning model 110 may be a neural network or other transformer based machine learning model, in some embodiments. Multimodal machine learning model may, in some embodiments, be a very large machine learning model, trained across a wide variety of data and data modalities. As discussed in detail below with regard to FIGS. 2 and 3, multimodal machine learning model 110 may be considered a foundation model, in some embodiments, trained across a large and general data set and implemented using millions, billions or more parameters.

To perform search request 152, machine learning system may cascade or otherwise implement machine learning dimension reduction technique 120 following multimodal machine learning model 110. For example, when search request 152 is received, the input data may be encoded by multimodal machine learning model 110 to generate a first embedding as a vector with a large number of dimensions (e.g., 1,024 dimensions), such as illustrated at 112, where the feature space of first embedding 112 is a high-dimensional feature space. The first embedding may then be processed through machine learning dimension reduction technique 120 which, as noted above may include linear or non-linear techniques to project a reduced dimension embedding (e.g., with less dimensions, such as 128 dimensions), as indicated at 122, where the feature space of second embedding 122 is a lower-dimensional feature space with respect to the feature space of first embedding 112. In various embodiments, dimensions of vectors may refer to algebraic dimensions which may have a corresponding number of values (e.g., coordinates) for each dimension to specify a vector in that dimension. For example, a feature space (which also may be referred to as a vector space) that includes 1,024 dimensions may include vectors that are specified with 1,024 values, with one value per dimension). Dimensionality reduction techniques may lower the number of dimensions (e.g., values) specified in a vector in a feature space with lower dimensionality.

As discussed in detail below with regard to FIG. 4, the machine learning dimension reduction technique 120 may be selectable via an interface, in some embodiments, to build data object index 140, allowing for different reduction technique performance characteristics to be intentionally chosen according to various applications, systems, or services in which the search feature may be implemented. The dimension-reduced embedding projected from the embedding of multimodal machine learning model 110 may then be used by search technique 130 (e.g., using nearest neighbor or other comparison based searches) with respect to data object index 140. As discussed in detail below with regard to FIG. 5, in some embodiments, the search technique may be selectable to obtain different search performance characteristics, in some embodiments.

Data object index 140 may include respective object embeddings, such as embeddings 142*a*, 142*b*, 142*c*, 142*d*, and so on, for each data object (e.g., whether hundreds, thousands, millions of data objects, or more). Like search requests, multimodal machine learning model 110 may be used to index data objects, as indicated at 150, by generating respective embeddings and then using the machine learning dimension reduction technique 120 (the same one being applied as is used for performing a search request) to generate respective second embeddings (that are projections of the first embeddings) as the object embeddings 142. After performing the search, the search technique 130 may return a result 154 (e.g., of none, one, or more data objects) in response to the search request 152.

Please note that the previous description of dimension reduction for performing multimodal embedding searches is a logical illustration and thus is not to be construed as limiting as to the implementation of a multimodal machine learning model, machine learning system, machine learning dimension reduction technique, search technique and/or data object index.

This specification continues with a general description of a provider network that implements multiple different services, including a foundation model service (and other machine learning services, which may perform dimension reduction for performing multimodal embedding searches. Then various examples of, including different components/modules, or arrangements of components/module that may be employed as part of implementing the provider network are discussed. A number of different methods and techniques to implement dimension reduction for performing multimodal embedding searches are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
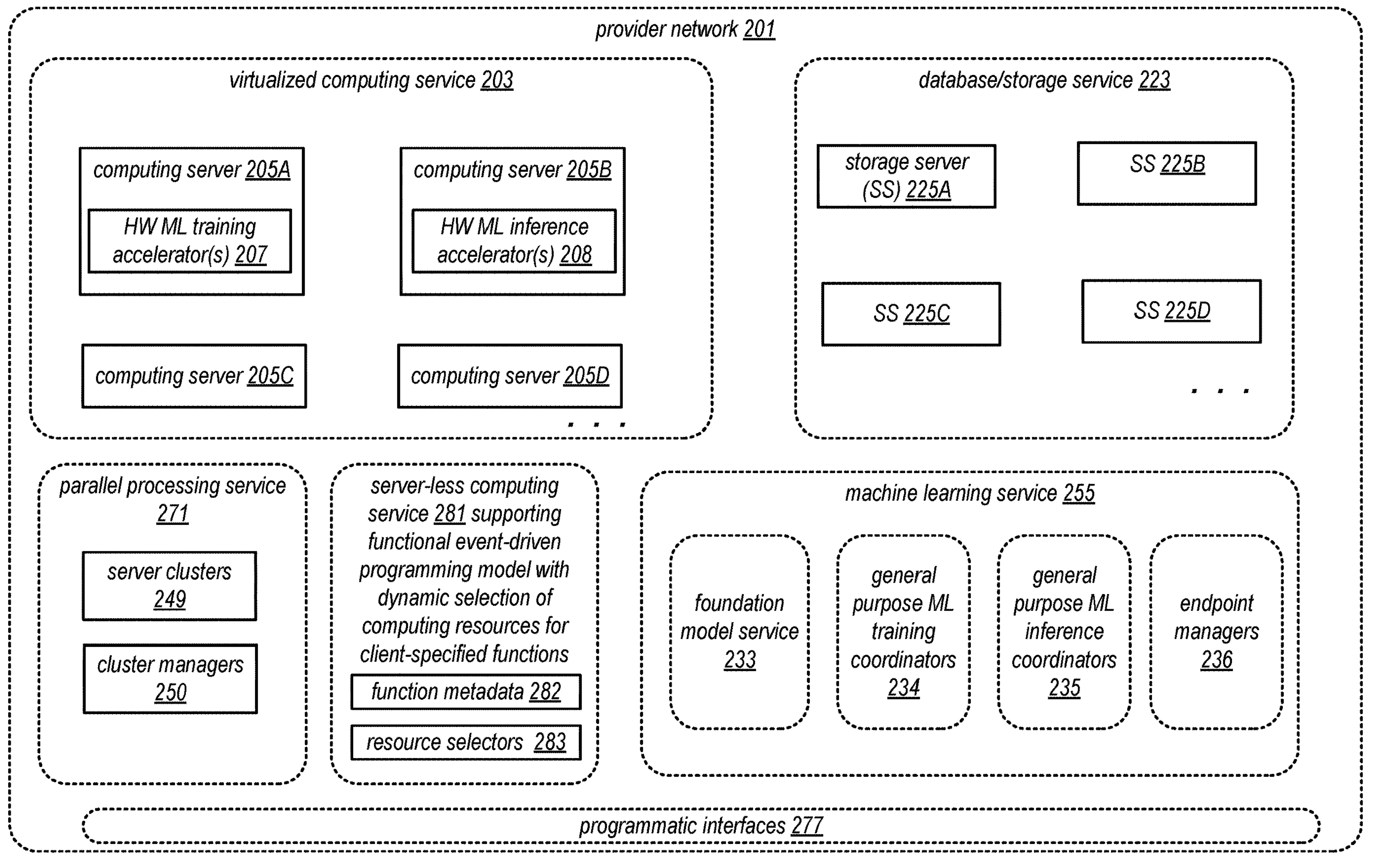
FIG. 2 illustrates an example provider network that may implement a service that implements dimension reduction for performing multimodal embedding searches, according to some embodiments.

FIG. 2 illustrates an example provider network that may implement a service that implements dimension reduction for performing multimodal embedding searches, according to some embodiments. In at least one embodiment, the techniques for dimension reduction for performing multi-modal embedding searches may be implemented as part of a provider network at a machine learning service, such as a foundation model service. The foundation model service may not be implemented as a subcomponent of the machine learning service but may instead be implemented as a separate service. In the embodiment shown in FIG. 2, in addition to the foundation model service, the machine learning may include general purpose machine learning training coordinators 234, general purpose machine learning inference coordinators 235, and a set of endpoint managers 236. The general purpose training coordinators may be used to train models that are not foundation models; similarly, the general purpose machine learning inference coordinators may be utilized to coordinate the generation of responses to inference requests that are directed to models other than foundation models. Endpoint managers 236 may set up logical network endpoints for various models (including foundation models of the foundation model service) in some embodiments, with associated sets of automatically-scaled resources associated with a given endpoint. End users of the models may direct inference requests intended for a given target model to the network address of a logical endpoint set up for that model.

In the embodiment shown in FIG. 2, the virtualized computing service may comprise a collection of computing servers which may be utilized as virtualization hosts, such as computing servers 205A-205D. Some of the computing servers may comprise one or more types of hardware accelerators, such as hardware machine learning training accelerators 207 or hardware machine learning inference accelerators 208. A hardware machine learning training accelerator may comprise circuitry which is optimized to speed up training computations of large machine learning models such as foundation models/large language models, and a hardware machine learning inference accelerator may comprise circuitry which is optimized to speed up inference computations of large machine learning models such as foundation models/large language models. In at least some embodiments, the training and/or inference computations of foundation models of the foundation model service may be performed using compute instances run at virtualized computing service computing servers equipped with such accelerators. In some embodiments, server clusters 249 of a parallel processing service, set up in response to programmatic requests by cluster managers may be utilized for parallel training of a foundation model/large language model and/or for parallel inference of an foundation model/large language model. The database/storage service 223 may comprise a plurality of storage servers such as SS 225A-225B, which may in some embodiments be used to store portions or all of training data, fine-tuning data sets, and other artifacts used by foundation models/large language models of the foundation model service. Components of a given service of a provider network may thus utilize components of other services in the depicted embodiment—e.g., foundation model service 233 may utilize compute instances run at the virtualized computing service, functions of the serverless computing service may be executed on virtualized computing service resources, model artifacts of the machine learning service may be stored at the database/storage service, and so on. Individual ones of the services shown in FIG. 2 may implement a respective set of programmatic interfaces 277 which can be used by external and/or internal clients (where the internal clients may comprise components of other services) in the depicted embodiment. In at least some embodiments, resources of a cloud provider network may not be required or used for a foundation model service; instead, for example, a standalone set of servers may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a foundation model service may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A virtualized computing service of the cloud provider network may offer virtual compute instances (also referred to as virtual machines, or simply "instances") with varying computational and/or memory resources in various embodiments, which may be used to implement functions of a foundation model service as indicated above. In one embodiment, each of the virtual compute instances may correspond to one of several instance types or families, and instances of any of several families may be employed for computations of the foundation model service. An instance type may be characterized by its hardware type, computational resources (e.g., number, type, and configuration of central processing units (CPUs) or CPU cores, hardware accelerators for various tasks including machine learning tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the machine learning service or machine learning service, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In various embodiments, a suite of foundation models (foundation models) such as large language models (large language models) using resources of a cloud provider network or cloud computing environment, and executing the models on behalf of end users of the cloud provider network in a fair and resource-efficient manner. Simple programmatic interfaces may be implemented at a foundation model service (foundation model service) of a cloud provider network in various embodiments, enabling them to provide input (e.g., text input or multimodal input) to a selected foundation model, and to receive corresponding responses. Third party foundation model developers or providers may register one or more versions of their own foundation models at the foundation model service. The foundation model service may also provide programmatic interfaces enabling users to fine tune baseline versions of foundation models, e.g., for their specific use cases by providing a few training examples, and deploy the fine-tuned versions of the foundation models at their own resources (e.g., within virtual private clouds (VPCs) or isolated virtual networks (IVNs)) set up on behalf of the foundation model service customers. Fine-tuned versions may also be registered as members of the suite of foundation models supported for public use by the foundation model service in some embodiments. In some embodiments, applications involving chain-of-thought reasoning may be built on top of the foundation model service (i.e., utilizing foundation models registered at the foundation model service), with application developers utilizing an orchestration service to coordinate operations performed at various stages of a chain of thought of one or more foundation models. In at least some embodiments new foundation models may be pre-trained at the foundation model service in response to programmatic requests and added to the suite of foundation models for which inference requests can be submitted.

In various embodiments, the foundation model service may represent an example of a fully managed service for all aspects of preparing and executing foundation models and associated applications, including input data preparation/processing, various phases of training (such as pre-training and fine-tuning, in some cases using parallel algorithms and hardware accelerators designed to speed up machine learning training), executing individual foundation models (in some cases using parallel algorithms and hardware accelerators designed to speed up machine learning inference), orchestrating applications which use chain-of-thought reasoning with the help of foundation models, and so on. As part of the fully-managed aspect of the service, resource management decisions such as scaling of the resources used for data preparation, training, and/or inference, ensuring high availability of the resources, capturing and providing metrics of the various tasks performed, and the like may all be handled automatically by the service. As a result, data scientists and engineers responsible for designing foundation models and associated applications may not have to concern themselves with resource management details in various embodiments. Similarly, end users may submit requests directed to the foundation models and associated applications and receive timely responses without having to be concerned with the specifics of the resources being used.

Figure 3:
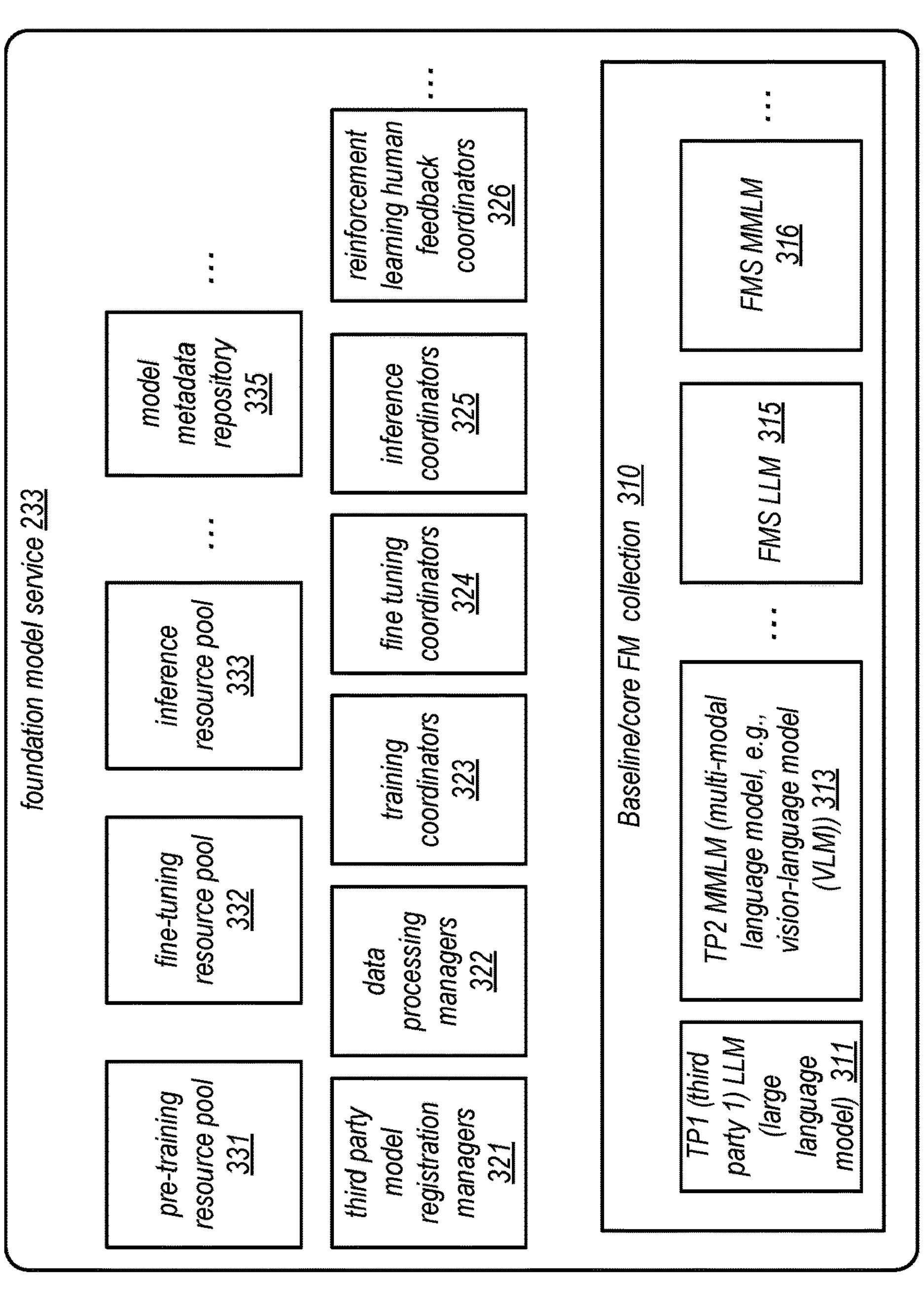
FIG. 3 illustrates an example system environment in which a collection of foundation models from several vendors may be hosted at a network-accessible service and which may implement dimension reduction for performing multimodal embedding searches, according to at least some embodiments.

FIG. 3 illustrates an example system environment in which a collection of foundation models from several vendors may be hosted at a network-accessible service and which may implement dimension reduction for performing multimodal embedding searches, according to at least some embodiments. The term "foundation model" generally refers to large neural network-based machine learning models that are trained initially (in a process often referred to as pre-training) using enormous amounts of data such as millions of text sentence examples, such that the resulting model learns enough about the input to be relatively easily adapted for many different downstream tasks. The models may be referred to as "large" because of the number of parameters that they each comprise (e.g., billions of parameters), and they may be referred to as "foundation" models in the sense that they can provide a foundation for performing many different kinds of inference or prediction tasks. Large language models (large language models), typically pre-trained using natural language inputs, are an important type of foundation model, and are used for a variety of applications including summarization, question-answering chatbots, classification and the like. Pre-training of foundation models may often use unsupervised, self-supervised or semi-supervised training techniques. A pre-trained foundation model may be fine-tuned (e.g., using a relatively small amount of labeled examples) for specific use cases and specific problem domains in some cases, although the pre-trained version of an foundation model may itself be able to perform high-quality inference tasks in many cases. The pre-trained foundation models may be referred to as baseline foundation models or core foundation models to distinguish them from fine-tuned versions in some embodiments.

FIG. 3 comprises artifacts and resources of a foundation model service (foundation model service) 302 which may be implemented at a provider network or cloud computing environment in some embodiments. The foundation model service may provide access to numerous large language models as well as multimodal language models such as vision-language models in the depicted embodiment. For example, a baseline or core foundation model collection 310 of the foundation model service may include TP1 large language model 311, TP2 multimodal model 313, foundation model service large language model 315 and foundation model service multimodal model 316, among others. TP1 large language model may be a large language model developed/designed by a third party TP1; that is, by an entity other than the operator of the foundation model service and other than the end users who may utilize TP1 large language model for inference using programmatic interfaces 377 of the foundation model service. TP2 multimodal model may have been pre-trained using multiple modes of input data, including for example a combination of text and video/images. foundation model service large language model 315 may be designed/developed by the organization which implements the foundation model service (such as the operator of a cloud provider network), and may also be referred to as a first-party or 3P large language model. foundation model service multimodal model may also be designed/developed by the organization which implements the foundation model service.

Data obtained from a variety of data sources 351 may be used to pre-train (and in some cases fine tune) foundation models to which access is provided by the foundation model service. The data sources may include, among others, portions of web crawl results obtained from subsets of the public Internet, publicly accessible source code repositories, as well as data corpuses that are not publicly accessible via the Internet.

The foundation model service may comprise a number of subcomponents in the depicted embodiment, each implemented using some combination of hardware and software at one or more computing devices. One or more third-party model registration managers 321 may coordinate workflows for adding third party foundation models to the foundation model service, e.g., including approving (or rejecting) registration requests for new third party foundation models based on a set of acceptance criteria of the foundation model service. Data processing managers 322 may be responsible for implementing a pipeline of transformations and filtering operations on input data that may be used for pre-training an foundation model, and for ensuring that the data used for such pre-training meets quality criteria of the foundation model service. Training coordinators 323 may, for example, implement a number of techniques for parallelizing pre-training of foundation models, e.g., using a set if resources of a pre-training resources pool 331. Fine tuning coordinators 324 may utilize resources of a fine-tuning resource pool to customize pre-trained foundation models at the request of the foundation model owners/developers in some embodiments. In at least some embodiments, fine-tuned foundation models may also be made accessible to end users via the programmatic interfaces 377. In at least some embodiments, the foundation model service may provide an indication, via programmatic interfaces 377) of all the different foundation models that are available for end users.

After an foundation model is pre-trained and/or fine-tuned, end user requests for inference using the foundation model may be processed in various embodiments at the foundation model service. One or more inference coordinators 325 may utilize resources of inference resource pool 333 to execute the foundation models and generate inference results that can be provided via the programmatic interfaces 377 in the depicted embodiment. Model metadata repository 335 may be used to store information such as the dates at which various foundation models were pre-trained or fine-tuned, the data sets used for pre-training or fine-tuning, restrictions/permissions specified by the foundation model owners on the use of their foundation models, performance metrics collected during pre-training, fine-tuning, or inference, and so on. In some embodiments model metadata repository 335 may also be used to store preferences of foundation model owners/developers regarding aspects such as targeted high availability levels, targeted types of hardware accelerators for training/inference, and so on. In one embodiment, as described below in further detail, reinforcement learning from human feedback may be employed as one of the stages of preparing a given foundation model. The operator of the foundation model service may have staff trained for providing the feedback used for reinforcement learning human feedback, and one or more reinforcement learning human feedback coordinators 326 may organize access to such staff in various embodiments. In various embodiments the foundation model service may also include a set of control plane or administrative nodes, responsible (among other tasks) for monitoring the health and status of some or all of the other subcomponents of the foundation model service, provisioning resources as needed for the other subcomponents, and so on. The control plane components are not shown in FIG. 3.

A number of auxiliary services 354 may utilize the foundation model service in various ways in some embodiments. For example, in some embodiments, results generated by an foundation model hosted at the foundation model service may be fed as input to perform one or more tasks at an auxiliary service. In another embodiment, an large language model-based application development service may be implemented, in which chain-of-thought reasoning may be used to perform multi-step tasks.

In various embodiments, the foundation model service may implement a set of programmatic interfaces 377, such as one or more web-based consoles, command-line tools, graphical user interfaces and/or application programming interfaces (APIs). The programmatic interfaces may be utilized by foundation model service customers of several different classes. One class of customers may include, for example, foundation model developers/designers who wish to utilize the foundation model service for registering their large language models, processing input data to train other large language models, fine-tuning their large language models, and so on. Another class of customers may include end users who wish to obtain inference results from large language models hosted by the foundation model service. Requests may be submitted to the foundation model service via the programmatic interfaces by the various classes of customers from client devices 345 (such as laptops, desktops, mobile devices, phones and the like), and responses may be provided to the client devices from the foundation model service.

As mentioned above, in at least some embodiments a foundation model service similar in features and functionality to foundation model service 302 of FIG. 3 may be implemented at least in part at a cloud computing environment referred to as a provider network. FIG. 2 illustrates an example provider network, according to at least some embodiments. In the depicted embodiment, provider network 201 may comprise resources used to implement a plurality of network-accessible services, including for example a virtualized computing service (virtualized computing service) 203, a database/storage service 223, a parallel processing service 271, a server-less computing service (serverless computing service) 281 as well as a machine learning service (machine learning service) 255 within which an foundation model service 233 similar in features to foundation model service 302 of FIG. 3 is implemented. The serverless computing service may implement an event-driven functional programming model. An end user of the service may simply specify a function to be executed, and an event or events which are to trigger execution of the function. Function metadata 282 may, for example, comprise a repository of function definitions and associated requirements (e.g., whether a given function requires a particular software stack or hardware component). As and when the specified events occur, the serverless computing service resource selectors 283 may dynamically select the particular resource at which the function should be executed, without the end user having to acquire any resources in advance.

Figure 4:
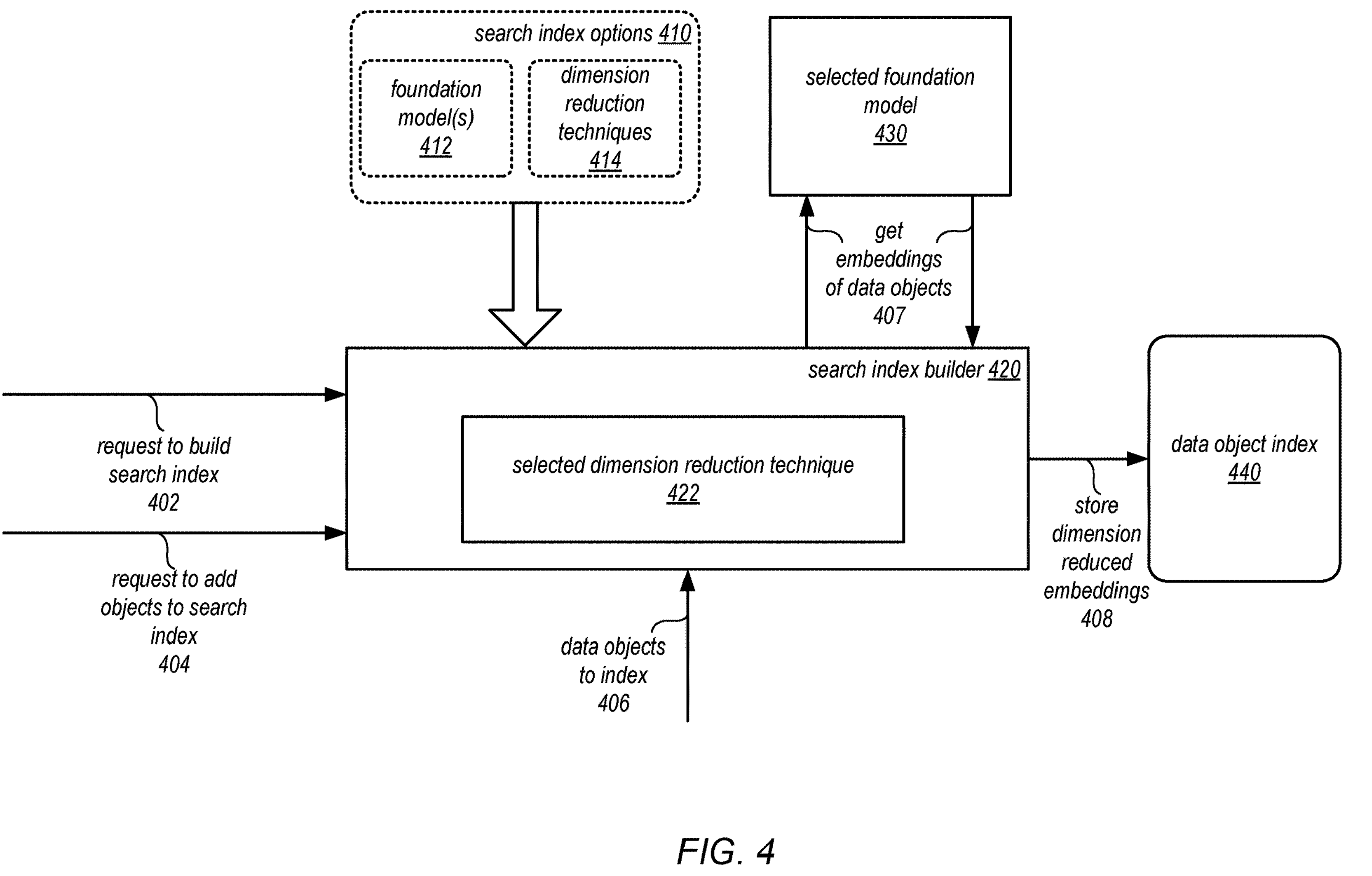
FIG. 4 illustrates a logical block diagram of a search index builder that performs dimension reduction for performing multimodal embedding searches, according to some embodiments.

FIG. 4 illustrates a logical block diagram of a search index builder that performs dimension reduction for performing multimodal embedding searches, according to some embodiments. Search index builder 420 may be implemented as part of foundation model service 302, machine learning service 255, or other services of provider network 201 which may make use of foundation models to build a search index. A request to build a search index 402 may be received at search index builder 420. Search index builder may support different index options 410, including the use of different ones of foundation models 412, which may be multimodal and made available through foundation model service 302. Similarly, different dimension reduction techniques 414, as discussed in detail below, may be selectable for building the index.

To build a requested search index, search index builder 420 may obtain the data objects to index, as indicated by 406 (e.g., accessing various internal or external data stores/services of provider network 201). Then, the selected foundation model 430 may be invoked to produce embeddings for the data objects, as indicated at 407. These embeddings may then be reduced using the selected dimension reduction technique (e.g., which may project the dimension reduced embeddings) and stored 408 as the dimension reduced embeddings for the data object index. Similar techniques may be performed for a request to add objects to a search index, as indicated at 404.

In some embodiments, as part of a request to build a search index 402, the request can include the generation of one of the modes of data to create the multi-modal search index. For example, in a text-image database, request 402 can include a request to generate image captions for a set of images to index. Prior to generating the embeddings of data objects, search index builder 420 may invoke an image classifier machine learning model (not illustrated) which may be trained to generate classification labels for individual images in the set of images. Then, these classification labels may be paired with their corresponding images to get embeddings of data objects 407 using the selected multi-modal foundation model 430.

Figure 5:
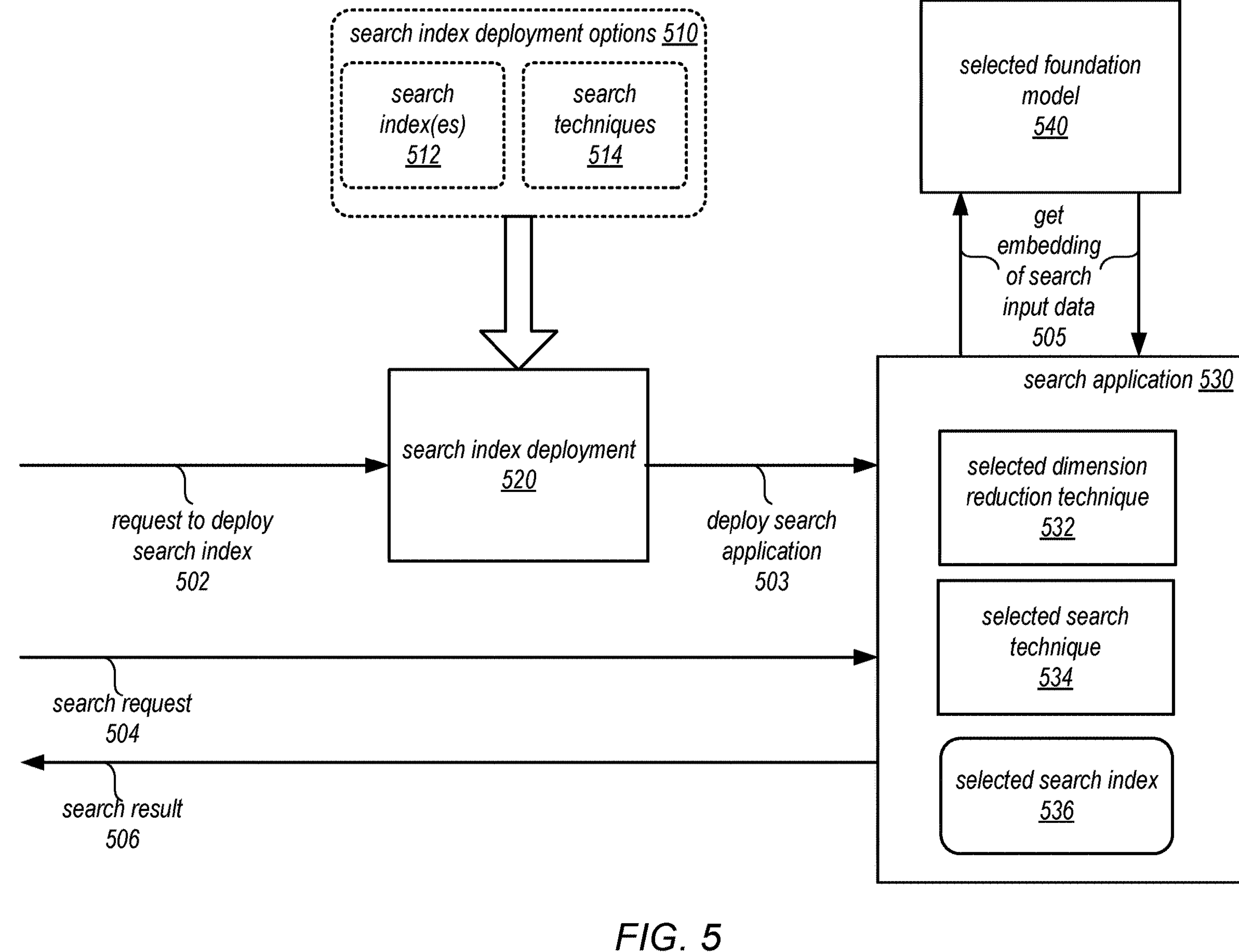
FIG. 5 illustrates a logical block diagram of a search application deployment that performs dimension reduction for performing multimodal embedding searches, according to some embodiments.

FIG. 5 illustrates a logical block diagram of a search application deployment that performs dimension reduction for performing multimodal embedding searches, according to some embodiments. Search index deployment 520 may be implemented as part of foundation model service 302, machine learning service 255, or other service of provider network 201 which may make use of foundation models to search a built search index. A request to deploy a search index 502 may be received at search index deployment 520. Search index deployment options 510 may include the available search index(es) 512 and search techniques 514 that are supported. Search index deployment 520 may then gather, instantiate, and/or provision computing resources to host and execute search application 530. In this way, search application 530 may use the selected dimension reduction technique 532 (that was used to build selected search index 536), selected search technique 534, and selected search index 536 to perform a search request. The selected foundation model 540 (that was used to build selected search index 536) may be used to get an embedding of search input data, as indicated at 505, upon which dimension reduction may be performed using selected dimension reduction technique 532. Then, search index 536 may be searched using the dimension-reduced embedding of search input data using selected search technique 534 to return a search result 506.

Although FIGS. 2-5 have been described and illustrated in the context of a provider network implementing a foundation model service, the various components illustrated and described in FIGS. 2-5 may be easily applied to other systems that utilize multimodal search indexes. As such, FIGS. 2-5 are not intended to be limiting as to other embodiments of dimension reduction for performing multimodal embedding searches.

Figure 6:
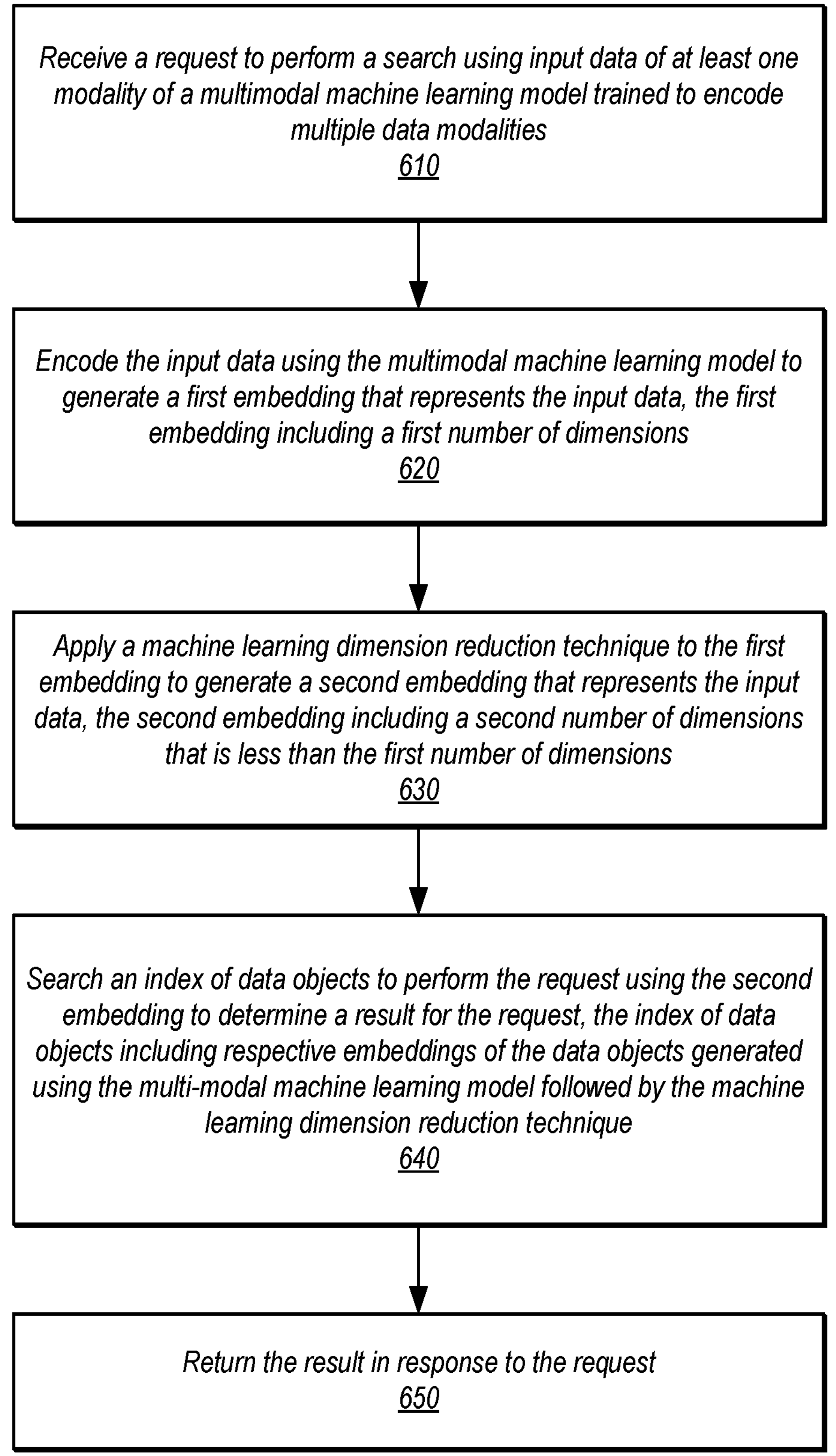
FIG. 6 illustrates a high-level flowchart of various methods and techniques to implement dimension reduction for performing multimodal embedding searches, according to some embodiments.

FIG. 6 illustrates a high-level flowchart of various methods and techniques to implement dimension reduction for performing multimodal embedding searches, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, a request to perform a search using input data of at least one modality of a multimodal machine learning model trained to encode multiple data modalities, in some embodiments. As noted above, multimodal machine learning models may learn the meanings between different types of data, modalities. For example, a multimodal machine learning model may learn that the semantic meaning of the text "red apple" is also describing images depicting "apples" that are "red" (as opposed to "green" or "yellow") apples. Thus, the search request may include input data of one (or multiple) data modalities for performing the search request. Example combinations for some embodiments include, but are not limited to, text to search for image(s), text and image(s) to search for image(s), image(s) to search for text, and image(s) and text to search for text.

As indicated at 620, the input data may be encoded using the multimodal machine learning model to generate a first embedding that represents the input data, the first embedding including a first number of dimensions, in some embodiments. In various embodiments, the multimodal machine learning model may be transformer based model that encodes input data into a feature space of the multimodal machine learning model (sometimes referred to as "latent space" or "vector space"). The encoded form may be referred to as an embedding that is in a vector data structure, in which different dimension values (e.g., coordinates) of the vector corresponding to different features. As noted above with regard to FIG. 1, the embeddings may include a high number of dimensions (e.g., over 1,000) in some embodiments. The multimodal machine learning model may include models of various sizes and types, and may, in some embodiments, be considered a foundation model.

As indicated at 630, a machine learning dimension reduction technique may be applied to the first embedding to generate a second embedding that represents the input data, including a second number of dimensions that is less than the first number of dimensions, in some embodiments. In various embodiments, machine learning dimension reduction techniques may include both linear and non-linear projection algorithms. For example, each of these types of reduction techniques may satisfies the following criteria: the projection layers should preserve the original encoders for backward compatibility and the overhead in encoding latency due to projection layers may be small so that there is net improvement in latency due to dimensionality reduction. Under linear projection, an example technique is Principal Component Analysis (PCA) that learns a projection matrix using an unsupervised objective. Under non-linear projection, an example technique is to train Multilayer Perceptrons heads (MLP-heads) using large data sets to increase the capacity of projected embeddings.

In various embodiments, PCA may learn a projection matrix for the multimodal machine learning model embeddings using the unsupervised objective of variance minimization in training-data features. Since, multimodal retrieval with these embeddings may rely on a shared vector space for multiple modalities (e.g., image and text data), a shared projection matrix for both modalities may be computed. The projection matrix may be applied on L2 normalized embeddings of the multimodal machine learning model encoders, in some embodiments.

In various embodiments, MLP heads (e.g., one or more input layers of a feedforward artificial neural network) are trained on large datasets with the same contrastive objectives as the pre-training stage of the multimodal machine learning model. These MLP heads are cascaded after the multimodal machine learning modal encoders and sufficiently lightweight such that their contribution to the total encoding latency may be very small.

As indicated at 640, a search of an index of data objects to perform the request using the second embedding to determine a result for the request may be performed, in some embodiments. The index of data objects may include respective embeddings of the data objects generated using the multimodal machine learning model followed by the machine learning dimension reduction technique, in some embodiments. The search technique may be one of multiple different search techniques. For example, an exact nearest neighbor search technique may be implemented, in some embodiments, which may compare each second embedding with each example of a retrieval set. Another technique may be an approximate nearest neighbor search.

For these search techniques, different hyperparameters may be used. For example, hyperparameters associated with the approximate search are the number of clusters (k) and the number of searched-clusters (nprobe). In the simplest setting where search is performed only within the nearest cluster (nprobe=1). In some scenarios, latency can be improved by dividing the retrieval set into large number of clusters (high value of k). However, retrieval for each cluster could be too small of a size, resulting in an extremely crude approximation to an exact search. In that case, increasing the nprobe to search multiple clusters can achieve better performance without significantly increasing latency, in some embodiments.

As indicated at 650, a result of the request may be returned in response to the request, in some embodiments. The result may include none, one or multiple data objects, which may, in some embodiments, be configured as a parameter or configuration of the search technique that specifies a number (e.g., top-n) of search results.

Figure 7:
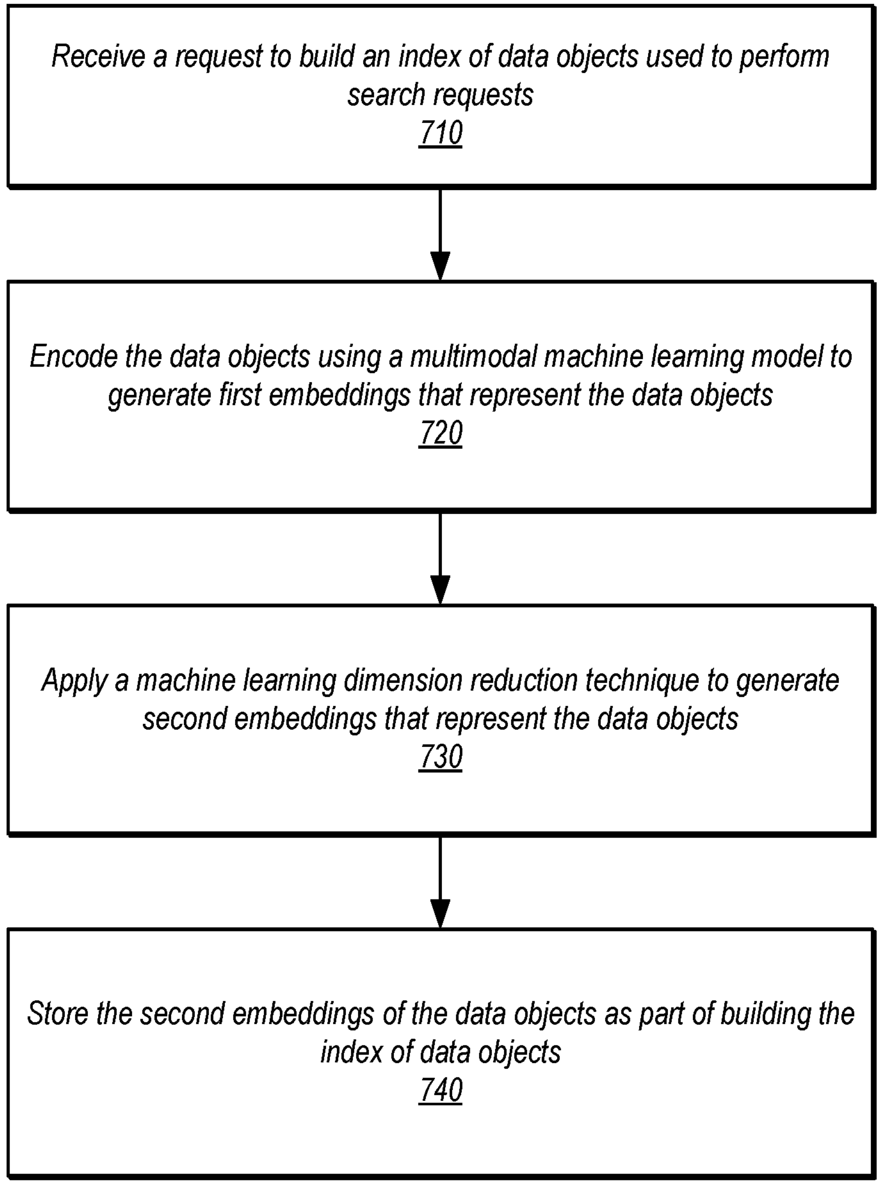
FIG. 7 illustrates a high-level flowchart of various methods and techniques to implement building a search index for performing multimodal embedding searches with dimension reduction, according to some embodiments.

FIG. 7 illustrates a high-level flowchart of various methods and techniques to implement building a search index for performing multimodal embedding searches with dimension reduction, according to some embodiments. As indicated at 710, a request to build an index of data objects used to perform search requests may be received, in some embodiments. As discussed above, the request could include a specified dimension reduction technique and/or multimodal machine learning model to use, in some embodiments.

As indicated at 720, the data objects may be encoded using a multimodal machine learning model to generate first embeddings that represent the data objects, in some embodiments. As discussed above with regard to FIG. 6, the multimodal machine learning model may be a transformer based model that encodes input data into a feature space of the multimodal machine learning model (sometimes referred to as "latent space"). The encoded form may be referred to as an embedding that is vector data structure, in which different dimension values of the vector corresponding to different features. As noted above with regard to FIG. 1, the embeddings may include a relatively high number of dimensions (e.g., over 1,000) in some embodiments. The multimodal machine learning model may include models of various sizes and types, and may, in some embodiments, be considered a foundation model.

As indicated at 730, a machine learning dimension reduction technique to generate second embeddings that represent the data objects may be applied, in some embodiments. As discussed above with regard to FIG. 6, machine learning dimension reduction techniques may include both linear and non-linear projection algorithms. For example, each of these types of reduction techniques may satisfies the following criteria: the projection layers should preserve the original encoders for backward compatibility and the overhead in encoding latency due to projection layers may be small so that there is net improvement in latency due to dimensionality reduction. Under linear projection, an example technique is PCA that learns a projection matrix using an unsupervised objective, as discussed above. Under non-linear projection, an example technique is to train MLP-heads using large data sets to increase the capacity of projected embeddings, as discussed above.

In some embodiments, multiple embedding sizes may be used for an index. For example, for a text-image index, the techniques described above can adapt to multiple embedding sizes, while preserving the embeddings of the images (in order to avoid having to re-index the images at a specific embedding size). To do this, the machine learning dimension reduction technique may use a fine-tuned component (e.g., an MLP-head) that corresponds to a particular embedding size. In this way, separate fine-tuned components for different embedding sizes can be implemented to achieve second embeddings of data objects that correspond to the different embedding sizes. In the text-image index example above, respective text and image MLP-heads may be implemented for dimensionality reduction. However, in this example embodiment, the text MLP-head may be fine-tuned to a particular embedding size, while the MLP-head for image may not have to be fine-tuned to a particular embedding size.

As indicated at 740, the second embeddings of the data objects are stored as part of building the index of data objects, in some embodiments. For example, respective entries for each data object may be updated with the respective embeddings. Data structure information, such as cluster techniques that group similar embeddings together may be created according to a selected search technique that the index may support, in some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
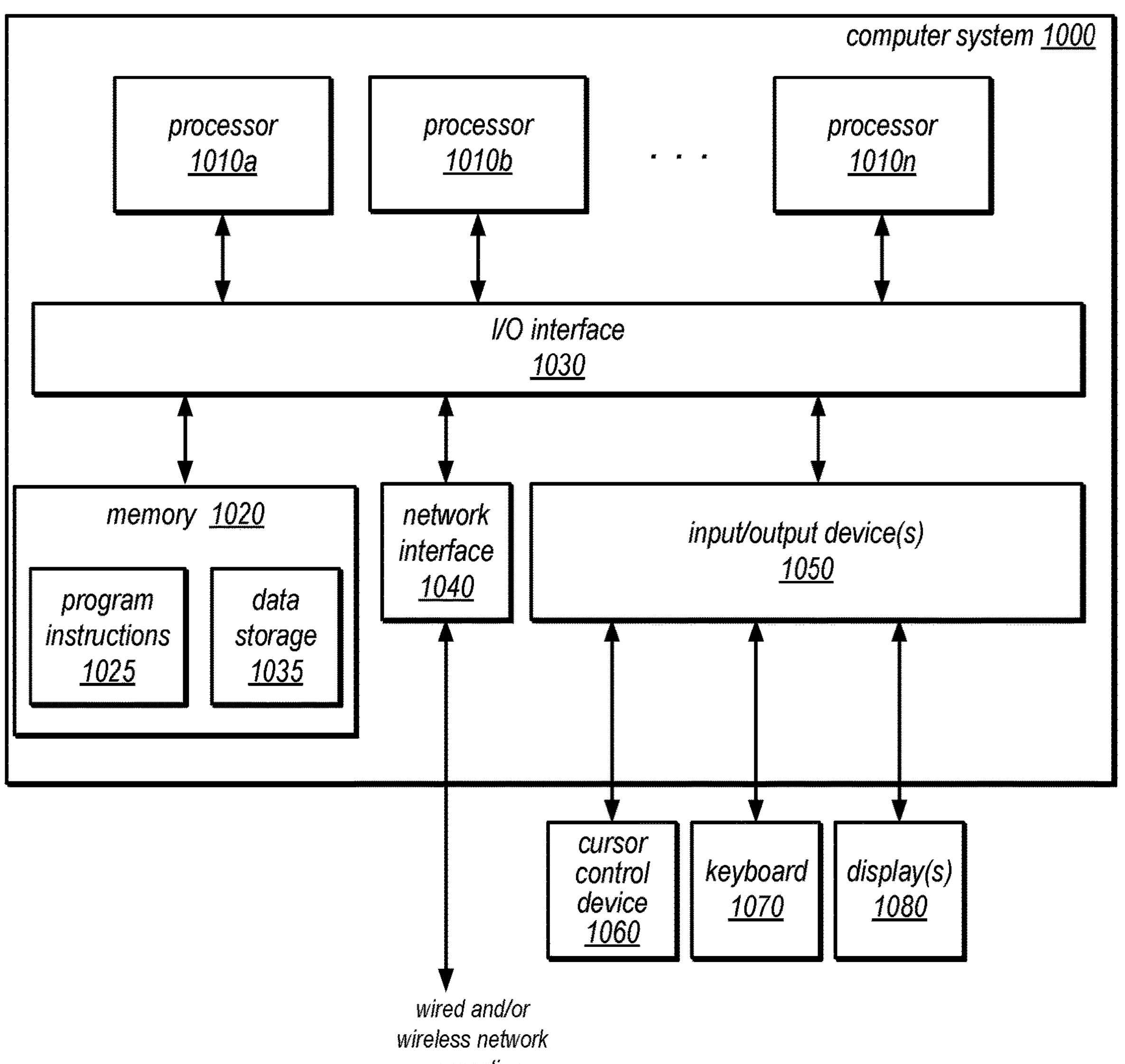
FIG. 8 illustrates an example system to implement the various methods, techniques, and systems described herein, according to some embodiments.

Embodiments of dimension reduction for performing multimodal embedding searches as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a plurality of computing devices, respectively comprising at least one processor and a memory, that implement a machine learning service, wherein the machine learning service is configured to host a search application and index of data objects accessed by the search application to perform search requests, wherein the search application is configured to:

receive a request to perform a search using input data comprising at least one modality of a multimodal foundation model trained to encode a plurality of data modalities, wherein the multimodal foundation model is accessible by the machine learning service;

cause the input data to be encoded using the multimodal foundation model to generate a first embedding that represents the input data, the first embedding comprising a first number of dimensions;

generate a second embedding using the first embedding, which was previously generated by encoding the input data using the multimodal foundation model, as input to a machine learning dimension reduction technique, wherein the second embedding comprises a second number of dimensions that is less than the first number of dimensions of the first embedding; and compare the second embedding to one or more embeddings of the index of data objects as part of performing a search technique to determine a result for the request, wherein the index of data objects used to compare with second embedding for the search comprises respective embeddings of the data objects that were generated from initial embeddings encoded from other input data and subsequently reduced from the first number of dimensions to the second number of dimensions using the machine learning dimension reduction technique; and return the result in response to the request.

2. The system of claim 1, wherein the machine learning service is further configured to:

receive a request to build the index of data objects;

cause the data objects to be encoded using the multimodal foundation model to generate the initial embeddings;

generate respective second embeddings using the initial embeddings using the machine learning dimension reduction technique;

store the respective second embeddings as the respective embeddings of the data objects in the index of data objects.

3. The system of claim 2, wherein the request to build the index specifies the machine learning dimension reduction technique out of a plurality of supported machine learning dimension reduction techniques.

4. The system of claim 1, wherein the search technique is specified in a request received at the machine learning service and wherein the search technique is one out of a plurality of different search techniques supported by the machine learning service.

5. A method, comprising:

receiving, at a machine learning system, a request to perform a search using input data comprising at least one modality of a multimodal machine learning model trained to encode a plurality of data modalities;

encoding, by the machine learning system, the input data using the multimodal machine learning model to generate a first embedding that represents the input data, the first embedding comprising a first number of dimensions;

applying, by the machine learning system, a machine learning dimension reduction technique to the first embedding, which was previously generated by encoding the input data using the multimodal foundation model, to generate a second embedding that represents the input data, the second embedding comprising a second number of dimensions that is less than the first number of dimensions of the first embedding;

searching, by the machine learning system, an index of data objects to perform the request using the second embedding to determine a result for the request, wherein the index of data objects used to compare with the second embedding for the search comprises respective embeddings of the data objects that were generated from initial embeddings from other input data and subsequently reduced from the first number of dimensions to the second number of dimensions using the machine learning dimension reduction technique; and returning, by the machine learning system, the result in response to the request.

6. The method of claim 5, further comprising:

receiving, at the machine learning system, a request to build the index of data objects;

encoding, by the machine learning system, the data objects using the multimodal foundation model to generate the initial embeddings for the data objects;

applying, by the machine learning system, the machine learning dimension reduction technique to the initial embeddings to generate respective second embeddings of the data objects; and storing, by the machine learning system, the respective second embeddings as the respective embeddings of the data objects in the index of data objects.

7. The method of claim 6, wherein the request to build the index specifies the machine learning dimension reduction technique out of a plurality of supported machine learning dimension reduction techniques.

8. The method of claim 5, wherein the machine learning dimension reduction technique are trained two or more layer multilayer perceptrons (MLP).

9. The method of claim 5, wherein the multimodal machine learning model is specified in a request received at the machine learning system and wherein the multimodal machine learning modal is one out of a plurality of different multimodal machine learning models accessible by the machine learning system.

10. The method of claim 5, further comprising:

receiving, at the machine learning system, a request to add a new data object to the index of data objects;

encoding, by the machine learning system, the new data object using the multimodal foundation model to generate a first embeddings for the new data object;

applying, by the machine learning system, the machine learning dimension reduction technique to the first embedding of the new data object to generate a second embedding of the new data object; and storing, by the machine learning system, the second embedding of the new data object in the index of data objects.

11. The method of claim 5, wherein the at least one modality is text and image, and wherein the result provides one or more image data objects.

12. The method of claim 5, wherein the at least one modality is text and wherein the result provides one or more image data objects.

13. The method of claim 5, wherein the searching performs a search technique that is specified in a request received at the machine learning system and wherein the search technique is one out of a plurality of different search techniques supported by the machine learning system.

14. One or more non-transitory, computer-readable storage media, storing program instructions that when executed on or across one or more computing devices cause the one or more computing devices to implement a machine learning service that implements:

receiving a request to perform a search using input data comprising at least one modality of a multimodal machine learning model trained to encode a plurality of data modalities;

encoding the input data using the multimodal machine learning model to generate a first embedding that represents the input data, the first embedding comprising a first number of dimensions;

generating a second embedding using the first embedding, which was previously generated by encoding the input data using the multimodal foundation model, as input to a machine learning dimension reduction technique, wherein the second embedding comprises a second number of dimensions that is less than the first number of dimensions of the first embedding; and searching an index of data objects to perform the request using the second embedding to determine a result for the request, wherein the index of data objects used to compare with the second embedding for the search comprises respective embeddings of the data objects that were generated from initial embeddings from other input data and subsequently reduced from the first number of dimensions to the second number of dimensions using the machine learning dimension reduction technique; and returning the result in response to the request.

15. The one or more non-transitory, computer-readable storage media of claim 14, storing further program instructions that when executed on or across the one or more computing devices, cause the machine learning service to further implement:

receiving a request to build the index of data objects;

encoding the data objects using the multimodal foundation model to generate the initial embeddings for the data objects;

applying the machine learning dimension reduction technique to the initial embeddings to generate respective second embeddings of the data objects; and storing the respective second embeddings as the respective embeddings of the data objects in the index of data objects.

16. The one or more non-transitory, computer-readable storage media of claim 15, wherein the request to build the index specifies the machine learning dimension reduction technique out of a plurality of supported machine learning dimension reduction techniques.

17. The one or more non-transitory, computer-readable storage media of claim 14, wherein the machine learning dimension reduction technique principal component analysis technique that applies a learned projection matrix.

18. The one or more non-transitory, computer-readable storage media of claim 14, storing further program instructions that when executed on or across the one or more computing devices, cause the machine learning service to further implement:

receiving a request to add a new data object to the index of data objects;

encoding the new data object using the multimodal foundation model to generate a first embeddings of the new data object;

applying the machine learning dimension reduction technique to the first embedding of the new data object to generate a second embedding of the new data object; and storing the second embedding of the new data object in the index of data objects.

19. The one or more non-transitory, computer-readable storage media of claim 14, wherein the at least one modality is image, and wherein the result provides one or more text data objects.

20. The one or more non-transitory, computer-readable storage media of claim 14, wherein the searching performs a search technique that is specified in a request received at the machine learning service and wherein the search technique is one out of a plurality of different search techniques supported by the machine learning service.

* * * * *